United States Patent [19]

Brosene, Jr.

[11] 3,865,171

[45] Feb. 11, 1975

[54] LOWER BEAD BREAKER ADAPTER

[75] Inventor: William G. Brosene, Jr., Cincinnati, Ohio

[73] Assignee: Magnum Automotive, Inc., Cincinnati, Ohio

[22] Filed: Sept. 24, 1973

[21] Appl. No.: 400,390

[52] U.S. Cl. .............................. 157/1.24, 157/1.28
[51] Int. Cl. ............................................ B60c 25/00
[58] Field of Search ............ 157/1.24, 1.26, 1.28, 1

[56] References Cited
UNITED STATES PATENTS

| | | | |
|---|---|---|---|
| 2,695,659 | 11/1954 | Athmann | 157/1.24 |
| 3,246,681 | 4/1966 | May | 157/1.28 |
| 3,742,999 | 7/1973 | Myers, Jr. | 157/1.24 |

FOREIGN PATENTS OR APPLICATIONS

| | | | |
|---|---|---|---|
| 552,223 | 4/1923 | France | 157/1.26 |

Primary Examiner—Al Lawrence Smith
Assistant Examiner—Harold P. Smith, Jr.
Attorney, Agent, or Firm—Wood, Herron & Evans

[57] ABSTRACT

A lower bead breaker adapter that may be selectively interfitted with the table of an automatic tire changer machine. The adapter is used only when a tire is to be demounted from a wheel particularly characterized by a bottom rim that is elevated off of, i.e., does not lie directly upon, the machine's table when the wheel is located on the table. The adapter provides an intermediate tracking or bearing surface over which the lower bead breaker's blade can ride so as to direct the blade into contact with the tire's lower bead for breaking that bead away from the wheel's rim.

5 Claims, 4 Drawing Figures

PATENTED FEB 11 1975

3,865,171

LOWER BEAD BREAKER ADAPTER

This invention relates to automatic tire changer machines. More particularly, this invention relates to the lower bead breaker structure of an automatic tire changer machine.

The demounting of a pneumatic tire from a wheel used to be done totally by hand. Such provided major problems for an operator in that a pneumatic tire's beads are relatively inflexible. When demounting the tire from the wheel, the tire's beads must be first broken away from the wheel's bead seats and then removed from the wheel's well area over one of the wheel's rims so the tire is free of the wheel. Over the years, a number of different types of automatic tire changer machines have been developed to provide means to mechanically assist an operator in initially breaking the tire's beads away from the wheel's bead seats, and then demounting the tire from the wheel.

Generally speaking, the major structural components of an automatic tire changer machine include a table on which the wheel is initially positioned, an automatically rotatable centerpost that extends up from the table through the center of the wheel, and a mount-/demount tool selectively engageable with the centerpost that functions to lift an old tire's beads over the rim off the wheel when the old tire is being demounted, and to seat a new tire's bead over the rim onto the wheel when the new tire is being mounted. The mount-/demount tool is mechanically rotated relative to the wheel when engaged with the centerpost to aid an operator in performing the mounting and demounting functions just explained.

In demounting a tire from a wheel, however, the tire's upper and lower beads must be broken away from the wheel's bead seats prior to making use of the rotatable mount/demount tool, i.e., prior to lifting the beads over the wheel's rim. As is generally known, pneumatic tires are provided with a substantial degree of air pressure inside, and that air pressure must be relieved prior to removing or demounting the tire from the wheel. Further, and particularly in the case of tubeless pneumatic tires, the tire's upper and lower beads (as the tire lies on the machine's table) are stuck to some extent, i.e., are sealed, against the wheel's upper and lower bead seats, respectively. Thus, the tire's beads must be broken away from the wheel's rims prior to removing the tire from the wheel during the demounting operation. In addition to the structural components previously mentioned, the more advanced automatic tire changer machines also make use of lower bead breaker and upper bead breaker mechanisms to aid in breaking the tire's upper and lower beads away from the wheel's bead seats.

A lower bead breaker mechanism is particularly adapted to break a lower bead (as the tire lies on the machine's table) away from the wheel's lower bead seat. This breaking operation is accomplished by means of a power unit that drives a lower bead breaker blade upwardly into the side wall of the tire immediately adjacent the tire's bead. In one prior art lower bead breaker mechanism, the lower bead breaker's blade tracks upwardly from the outer edge of the machine's frustoconically shaped table along the surface of the table until same contacts the wheel rim's bottom edge and, thereafter, tracks along the outer surface of the wheel's rim until the lower bead is broken away from its location in the wheel's bottom seat. The tracking transition of the lower bead breaker's blade from the machine table's sloping surface onto the outer surface of the wheel's rim at the bottom edge of that rim occurs without problem where the wheel is configured so that the bottom edge of the wheel's rim lies flush on the machine's table in the tracking path followed by the lower bead breaker's blade. That is, and because most wheels lie flat on the machine's sloping table in the tracking path of the lower bead breaker's blade, the lower bead breaker's blade is not impeded or trapped or otherwise stopped in its travel path during the tracking transition from the machine's table onto the outside surface of the wheel. Thus, an orderly tracking path is provided by which the lower bead breaker's blade can break a tire's lower bead away from the wheel's lower bead seat time after time when the wheel is structured so that the wheel rim's bottom edge lies directly upon or flat against the machine's sloping table in the path of the lower bead breaker's blade.

While the great majority of wheels are structured so that the bottom edge of the wheel's rim lies flat on an automatic tire changer machine's sloping table in the operational path of the lower bead breaker's blade, there are certain type wheels which do not lie flush against or flat upon the table in that path. Such wheels, for example, may include mag wheels and prestige wheels. Mag wheels are generally of a special cross sectional configuration, the wheel being chrome plated, or fabricated of magnesium or aluminum; the mag wheels are mainly an after-market equipment item that is purchased by automobile fanciers in an effort to provide the purchaser's automobile with a racier or more aesthetically pleasing appearance. Prestige wheels are generally found as original equipment on high priced sport model automobiles; prestige wheels are also of a special cross sectional configuration, and are chrome plated or fabricated of magnesium. These special wheels, when viewed in cross section along a diameter, are each characterized by a bottom edge of the wheel's rim that is materially offset above the tire changer machine's table when the rim is seated on the table preparatory to demounting of a pneumatic tire therefrom, i.e., preparatory to use of the lower bead breaker mechanism. That is, when the wheel is disposed on an automatic tire changer machine's table, the bottom edge of the wheel's rim is substantially elevated above the table in the operational path of the lower bead breaker's blade to the extent that, when viewed in a side cross-sectional view sense, a distinct and substantial gap is established between the wheel rim's bottom edge and the table's surface in the travel path of the lower bead breaker's blade. When the lower bead breaker is operated in an effort to break the lower bead away from a wheel of this type, the lower bead breaker's blade becomes trapped beneath the wheel, i.e., between the table and the wheel, because the wheel rim's bottom edge is located substantially above the table surface. That is, the lower bead breaker's blade becomes caught between the table and the wheel as the blade tracks on the table's surface because the wheel rim's bottom edge does not lie flush on the table's surface in the lower bead breaker blade's tracking path.

It has been a primary objective of this invention to provide a lower bead breaker adapter which may be selectively interfitted with an automatic tire changer machine's table. The adapter is so fitted onto the machine's table only when a tire is to be demounted from a wheel that is particularly characterized by a bottom rim elevated off of the machine's table in the travel path of a lower bead breaker's blade. The adapter provides an intermediate tracking surface over which the lower bead breaker's blade can ride between the table's surface and the outer peripheral surface of the wheel, thereby allowing the machine's lower bead breaker mechanism to function properly in breaking the tire's lower bead away from the wheel's lower bead seat.

Other objectives and advantages of this invention will be more apparent from the following detailed description taken in conjunction with the drawings in which.

THE PRIOR ART

Figure 3:
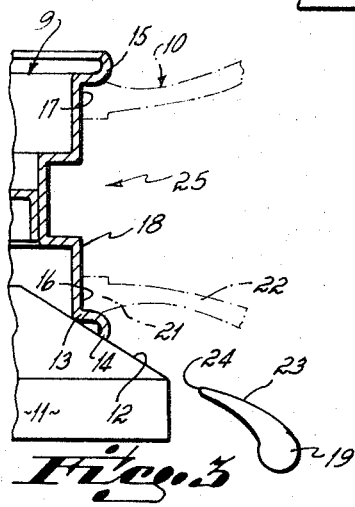
FIG. 3 is a view similar to FIGS. 1 and 2, but showing a wheel of the type not requiring use of an adapter.

A wheel 9 of the most commonly used configuration is illustrated in FIG. 3, the wheel (with tire 10 mounted thereon) being seated on an automatic tire changer machine's table 11 of the general frustoconical type, i.e., of the type having an upwardly sloping surface 12. The wheel 10 includes a bottom rim 13 (having edge 14), a top rim 15, a bottom bead seat 16, a top bead seat 17, and outer peripheral surface 18. The wheel 9 is positively located on the table 11 by suitable means, not shown. A blade 19 of a lower bead breaker mechanism (not shown) is shown in solid line position in operating proximity, i.e., in home position, relative to the table 1. The wheel's bottom rim edge 14 lies flush upon the table in the travel path of the lower bead breaker's blade 19.

The lower bead breaker's slightly curved blade 19 is oriented to contact the bead 21 area of the tire's lower side wall 22 with its top face 23. The lower bead breaker's blade 19 is driven upwardly by power means (not shown) which is part of the lower bead breaker mechanism. As the lower bead breaker's blade 19 moves upward and radially inward in response to the power means, the leading edge 24 of the blade contacts the table surface 12 and rides up on the table surface until it hits the wheel's lower rim 13 at edge 14. As the power means continues to move the lower bead breaker's blade upwardly and inwardly, the blade 19 rides up on, and tracks or follows, the rim's contour surface 18 until the tire's lower bead 21 is displaced into the wheel's well area 25. Note particularly that the lower bead breaker blade's leading edge 24 may easily make the transition from tracking on the table's upwardly inclined surface 12 onto the wheel's lower rim 13 because the rim lies flush on, i.e., rests directly on, the table itself in the travel path of the blade 19 so there is no hang up of the blade at the junction or interface of the wheel rim's bottom edge 14 and the table surface 12. This tracking function of the lower bead breaker's blade 19 is a result of the lower bead breaker's mechanism (not shown), such mechanisms being known to the art; one such mechanism is particularly shown and described in U.S. pat. application Ser. No. 328,017, filed Jan. 30, 1973, now U.S. Pat. No. 3,807,477, entitled BEAD BREAKER MECHANISM, invented by John T. Curtis, and assigned to the assignee of this application.

THE INVENTION

The wheels 30, 31 (with which the lower bead breaker adapters 32, 33 of this invention are especially adapted for use) are structured and configured so that the wheel rims' bottom edges 34 do not lie flush on, i.e., are definitely spaced relative to, an automatic changer machine table's upwardly inclined surface 35.

Figure 1:
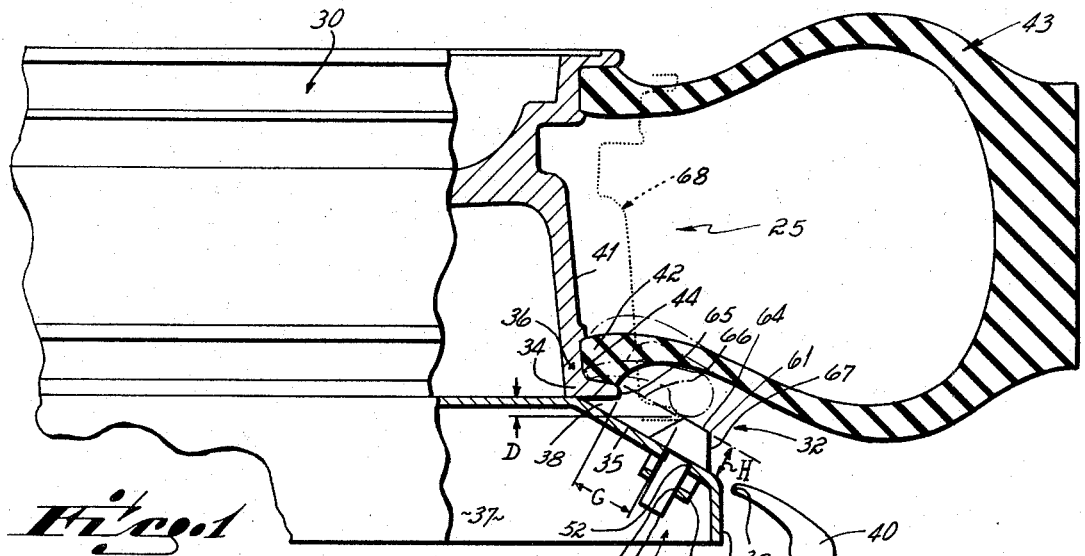
FIG. 1 illustrates a first embodiment of a lower bead breaker adapter in accord with the principles of this invention, same being shown in operational attitude with a mag wheel.

A mag wheel 30 is shown particularly in FIG. 1, the solid line illustration showing, in scale, a 13 inch diameter mag wheel and the phantom line illustration showing a 15 inch diameter mag wheel, although the adapter structure is useful on wheels having diameters of between about 12 inches and about 16 inches. As shown in both sized mag wheels, the outward or exposed bottom edge 34 of the wheel's rim 36 is spaced a vertical distance D above the sloping surface 35 of the machine's table 37. This vertical distance D is such that a gap or undercut 38 is established between the wheel rim and the table. This undercut geometry configuration 38 so formed between the wheel's rim 36 and the table 37 would, if no lower bead breaker adapter in accordance with this invention were present, allow the leading edge 39 of a lower bead breaker blade 40 to track up the table's surface until same was trapped or caught underneath the wheel 30 itself in that area designated 38 (assuming adapter 32 is in place). That is, the lower bead breaker's blade 40 would be prevented from tacking on the rim's outer surface 41 and, thereby, prevented from breaking the lower bead 42 of tire 43 away from the wheel's lower bead seat 44 when no adapter 32 is in place.

Figure 2:
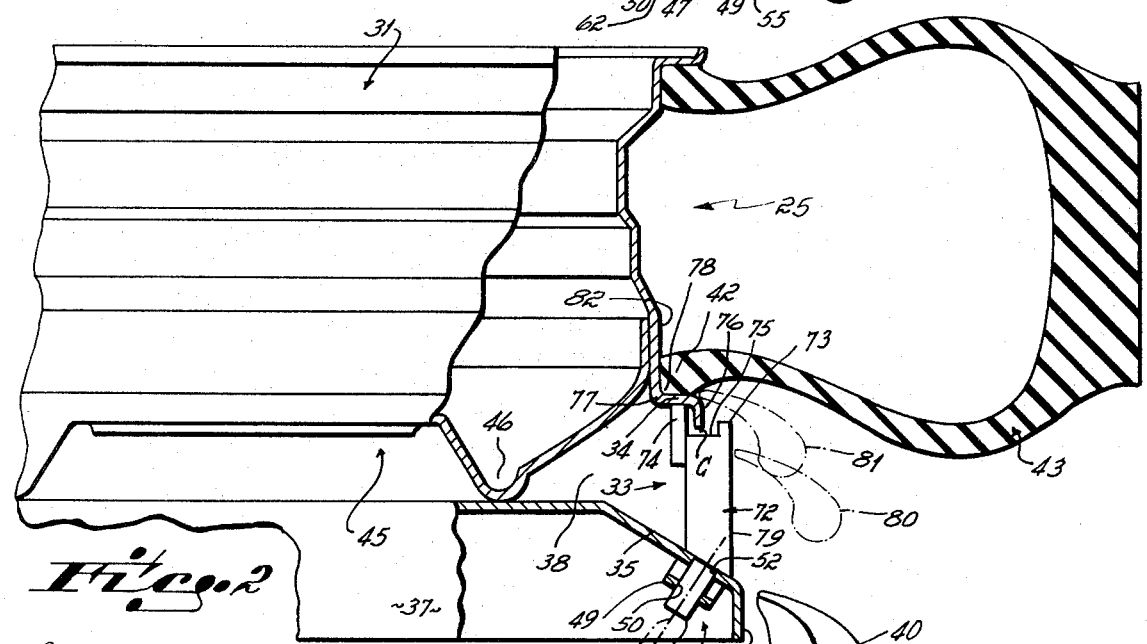
FIG. 2 is a view similar to FIG. 1 showing a second embodiment of the lower bead breaker adapter, same being shown in operational attitude with a prestige wheel.

Likewise, and as is shown in FIG. 2, a prestige wheel 31 presents the same problem. The prestige wheel 31 has a drop center dish 45 which is sized and configured (as at 46) such that the rim's outer edge 34 does not come into contact at all with the sloping surface 35 of the machine's table 37, i.e., the dish portion of the rim rests directly on the table. The undercut geometry configuration 38 so formed between the wheel 31 and the table 37 is even more pronounced with this type wheel than is the case with the mag wheel 30. The lower bead breaker's blade 40 entrapment problem arises when the lower bead breaker's blade is caused to track upwardly on the table 37 in an effort to break the lower bead 42 of the tire 43 mounted on the wheel 31 preparatory to demounting the tire from the wheel (assuming no adapter 33 is in place).

Figure 4:
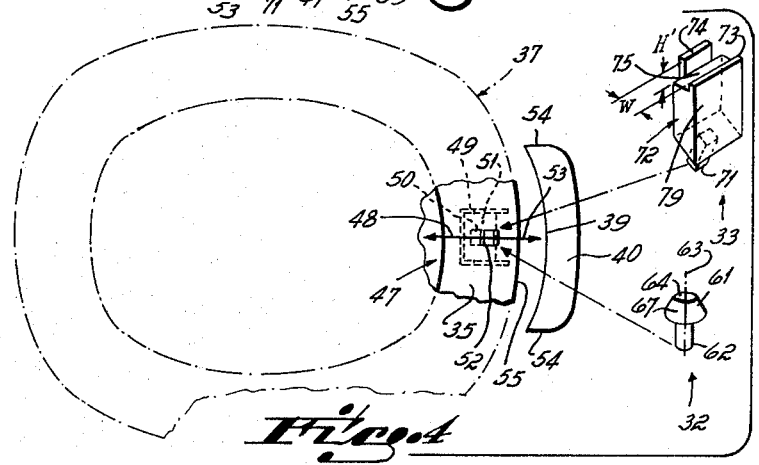
FIG. 4 is a partial top view of an automatic tire machine's table showing the adapter's mounting structure on the table, and showing each of the two adapter embodiments in perspective.

The first embodiment 32 of the lower bead breaker adapter of this invention is particularly directed for use with the mag wheel 30 (see FIG. 1) and the second embodiment 33 of the adapter is particularly adapted for use with the prestige wheel 31 (see FIG. 2). In both embodiments and as is illustrated in FIG. 4, the adapter 32 or 33 may be selectively interfitted with that portion (generally designated as 47) of the machine's table 37 which lies in the travel path (indicated by center line 48) of the lower bead breaker's blade 40. A strap 49 of U-shaped configuration is welded to the underside of the table 37, see also FIGS. 1 and 2. The strap 49 is provided with a square hole 50 centrally of the floor portion 51 thereof, that square hole being axially aligned with a similarly sized square hole 52 disposed in the table surface 35 (the axis 53 of holes 50, 52 is perpendicular to the table surface 35). These square holes 50, 52 are preferably directly in line with the travel path 48 of the lower bead breaker's blade 40, and spaced equidistant between the ends 54 of the lower bead breaker's blade, when that blade is tracking over the table's surface 35 in an operational cycle. Note that the holes 50, 52 are positioned adjacent the external periphery 55 of the machine's table 37.

The first embodiment 32 of the lower bead breaker adapter is illustrated in FIGS. 1 and 4. As shown in those figures, the adapter 32 is characterized by a frustoconical head portion 61 and a cylindrical post or foot portion 62, the cylindrical post (or connector device) being sized to fit within the square hole 50, 52 seat provided in the machine's table 37. Because the frustoconical head portion 61 is of a circular cross section transverse to the axis 63 of the adapter, the adapter will be correctly positioned whenever the post is in seated or fitted engagement with the table 37 as illustrated in FIG. 1. The height H of the frustoconical head is such that the adapter's top surface 64 (which is parallel to the sloping surface 35 of the machine's table 37) is in substantially the same plane which also includes the outer rim edge 65 of the 13 inch and 15 inch diameter mag wheels 30, that plane being illustrated by phantom line 66.

In use of the first embodiment 32, and when the lower bead 42 of a tire 43 mounted to a 13 inch mag wheel 31 is to be broken away from its bead seat 44 after the lower bead breaker's blade 40 has tracked upwardly over the table's surface 35 the lower bead breaker's blade proceeds to track onto conical surface 67 of the adapter and, thereafter, over top surface 64 of the adapter; ultimately, the blade 40 extends into operational or bead-breaking position relative to the 13 inch mag wheel's rim as illustrated by phantom lines FIG. 1. Note particularly that a gap G is present between the adapter's head 61 and the 13 inch mag wheel's rim edge 65 but this gap G is effectively spanned by the blade 40 as the blade extends up over the adapter 32, i.e., the blade is of a length such that same may readily span this gap G without the blade's leading edge 39 being caught underneath the wheel's rim 34. Once the lower bead breaker's blade 40 has spanned the gap G between the adapter's head 61 and the wheel rim's edge 65, same traverses the outer periphery 41 of the wheel's rim 34 so as to break the lower bead 42 away from the rim's lower seat 44. As noted, phantom line 68 indicates a 15 inch diameter mag wheel 31; with this size mag wheel the rim's outer edge 65 actually contacts the adapter's head 61. When the 15 inch mag wheel is being processed, the bead breaker's blade 40 simply passes from the top surface 64 of the adapter's head 61 onto the rim's exposed outer surface to break the tire's bead away from the rim's seat.

The second embodiment 33 of the lower bead breaker adapter is illustrated in FIGS. 2 and 4. As shown in FIG. 4, the adapter includes a post section 71 and a head section 72. The post section 71 (or connector device), by means of which the adapter 33 is seated or interfitted with the table 37, is of a square cross-sectional configuration adapted to mate with the square holes 50, 52 so as to prevent the adapter 33 from rotating within the hole. The head section 72 includes an upstanding portion having a front lip 73 and a rear lip 74, these lips being spaced one from the other to define seat 75. The seat width W is sufficient to accommodate prestige wheels 31 of, for example, twelve inch through 16 inch diameters. The rear lip 74 is of a vertical height H' (relative to the upwardly sloping surface 35 of the machine's table 37) to support the wheel's rim 34 at a location other than its extreme outer edge 76 and, thereby, establish a clearance C between the rim's edge 76 and adapter's seat 75. This support is desirable to prevent potential bending of the rim 34 about bending point 77 at lower bead seat 75 which might occur during use of an upper bead breaker mechanism (not shown) if the bottom edge 76 of the rim 34 was supported directly on the seat 75. The front lip 73 insures that the leading edge 39 of the lower bead breaker's blade 40 does not get trapped between the rim's bottom edge 46 and the adapter's seat 75 during operation of the lower bead breaker mechanism.

In use of the second embodiment 33, the lower bead breaker's blade 40 commences tracking on the exposed surface on the machine's table as is known to the art. Upon meeting the intersection of the adapter's vertical outer face 79 and the table's surface 35, the blade continues tracking up that vertical face into an intermediate attitude as illustrated by phantom lines 80. Subsequently, and upon reaching the top of that vertical outer face 79 presented by the second adapter 33, the blade 40 tracks inwardly into contact with the wheel's rim 34 as illustrated by phantom lines 81. Upon contacting the wheel's outer pheripheral surface 82, the lower bead breaker's blade 40 continues to track thereagainst and to press upon the underside of the pneumatic tire mounted to the rim, such upward tracking action being continued until the bottom bead 42 of the tire 43 is broken away from the wheel's bottom bead seat 78.

An automatic tire changer machine with which the lower bead breaker adapter 32, 33 of this invention is useful and, particularly, a lower bead breaker mechanism which provides a lower bead breaker's blade adapted to track on the top surface of the machine's table, is particularly illustrated and described in U.S. patent application Ser. No. 328,017, filed Jan. 30, 1973, now U.S. Pat. No. 3,807,477, entitled BEAD BREAKER MECHANISM, invented by John T. Curtis and assigned to the assignee of this application. It will be understood, of course, that the mag wheel 30 and the prestige wheel 31 are each fixed in place on the table 37 in accordance with mechanism illustrated in that application prior to activating the lower bead breaker mechanism illustrated in that application, the respective adapter 32 or 33 having been interfitted with the table prior to fixing the wheels 30 or 31 in place on the table.

Having described in detail the preferred embodiments of my invention, what I desire to claim and protect by Letters Patent is:

1. A modified table structure for a tire changer machine, said table structure including
   structure defining a first hole in the machine's table, said hole being positioned in the operational path of a lower bead breaker's blade, and an adapter removably connected to the machine's table when a tire is to be demounted from that type wheel configuration where an undercut gap is established between the wheel rim's bottom edge and the table when the wheel has been locked in place onto said table, and said adapter including a head portion that extends upwardly off said table's surface when said adapter is connected to said table, said head portion being seated on said table to provide an intermediate tracking surface between the table's surface and the wheel's outer peripheral surface over which the lower bead breaker's blade can ride during operation thereof, thereby preventing the lower bead breaker's blade from becoming entrapped within the undercut gap prior to contacting the tire's lower bead area, and a post fixed to the underside of said head, said adapter being removably connected to the machine's table simply by dropping said post into said hole, thereby permitting said adapter to be easily and quickly connected to and disconnected from said table.

2. An improvement as set forth in claim 5 including a strap fixed to the underside of said table, and structure defining a second hole in said strap, said second hole being aligned with said first hole, said post thereby being restrained in operational relation with the machine's table both by the table and the strap.

3. A modified table structure as set forth in claim 5 wherein said head is of a circular frustoconical configuration, that head configuration permitting said adatper to be dropped into said hole without concern for proper orientation of said head relative to the operational path of said lower bead breaker's blade.

4. A modified table structure as set forth in claim 1 wherein said head defines a seat that includes front and rear lips, said front lip serving to insure that the lower bead breaker's blade does not become trapped beneath the wheel rim's bottom edge, and said rear lip serving to support the wheel's rim at a location remote from the bottom lower edge thereof.

5. A modified table structure as set forth in claim 1, said adapter being provided with only one position on the machine's table at which same is engageable therewith, and said adapter being sized and configured to service all wheel diameters between about 12 inches and about 16 inches of a single wheel design.

* * * * *